(12) United States Patent
Cohen et al.

(10) Patent No.: US 12,769,688 B2
(45) Date of Patent: Oct. 20, 2026

(54) CROSS-POINT ARRAY WITH MATCHED FILTERS FOR NOISE REDUCTION

(71) Applicant: INTERNATIONAL BUSINESS MACHINES CORPORATION, Armonk, NY (US)

(72) Inventors: Guy M. Cohen, Westchester, NY (US); Takashi Ando, Eastchester, NY (US); Nanbo Gong, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 18/662,152

(22) Filed: May 13, 2024

(65) Prior Publication Data

US 2025/0348451 A1 Nov. 13, 2025

(51) Int. Cl.
*G06F 13/40* (2006.01)

(52) U.S. Cl.
CPC ...... *G06F 13/4004* (2013.01); *G06F 2213/40* (2013.01)

(58) Field of Classification Search
CPC ...................................................... G06N 20/00
See application file for complete search history.

(56) References Cited

U.S. PATENT DOCUMENTS 3,986,127 A * 10/1976 Ray .................... H03H 11/1217 327/344
9,082,180 B2 7/2015 Cabral
10,360,283 B2 7/2019 Gokmen et al.
10,373,051 B2 * 8/2019 Gokmen ................ G06N 3/065
11,069,331 B2 7/2021 Rakov
11,361,218 B2 6/2022 Rasch et al.
11,610,105 B2 3/2023 Kumar et al.
11,757,543 B2 9/2023 Chervyakov et al.
2007/0229112 A1 * 10/2007 Mouttet ............... H03K 19/177 326/39
2017/0083161 A1 3/2017 Jain et al.
2020/0091960 A1 3/2020 Moradi et al.
2021/0103802 A1 4/2021 Kumar et al.
2022/0180164 A1 6/2022 Rasch
2022/0318628 A1 10/2022 Cherupally et al.
2023/0131827 A1 4/2023 Wei et al.

OTHER PUBLICATIONS

Memristive Field-Programmable Analog Arrays for Analog Computing, Dec. 15, 2022 (Year: 2022).*
Spalt et al., "A Background Noise Reduction Technique using Adaptive Noise Cancellation for Microphone Arrays", In17th AIAA/CEAS Aeroacoustics Conference (32nd AIAA Aeroacoustics Conference) Jun. 2011, pp. 1-16.

(Continued)

*Primary Examiner* — Henry Tsai
*Assistant Examiner* — Juanito C Borromeo
(74) *Attorney, Agent, or Firm* — Harrity & Harrity, LLP

(57) ABSTRACT

A cross-point array includes an array of Resistive Processing Unit (RPU) devices having rows and columns interconnected at cross-points, wherein the RPU devices receive a finite duration input voltage on the rows and output a current on the columns. An input-signal matched filter is coupled to each of the columns to reduce noise in the current in accordance with the finite duration input voltage.

18 Claims, 6 Drawing Sheets

100

(56) References Cited

OTHER PUBLICATIONS

Li et al., "Demystifying CNNs for Images by Matched Filters", arXiv:2210.08521v1 [cs.CV] Oct. 16, 2022, pp. 1-10.
Anbiyaei et al., "White noise reduction for wideband linear array signal processing", IET Signal Process., 2018, vol. 12 Iss. 3, Feb. 2018, pp. 335-345.
Kelemenova et al., "Signal Noise Reduction and Filtering", Acta Mechatronica—International Scientific Journal about Mechanics, Jun. 2020, pp. 1-6.
Farag, "Matched Filter Interpretation of CNN Classifiers with Application to HAR", Sensors 2022, Oct. 2022, pp. 1-25.
Active Band Pass Filter, Retrieved from: https://web.archive.org/web/20250522222900/https://www.electronics-tutorials.ws/filter/filter_7.html, May 22, 2025, 11 pages.
Finite Impulse Response, Retrieved from: https://en.wikipedia.org/wiki/Finite_impulse_response, Mar. 23, 2023, 6 pages.
Fir1, Retrieved from: https://web.archive.org/web/20230103154604/https://www.mathworks.com/help/signal/ref/fir1.html, Jan. 3, 2023,10 pages.
Matched Filter, https://en.wikipedia.org/wiki/Matched_filter, May 2, 2025, 11 pages.

* cited by examiner

CROSS-POINT ARRAY WITH MATCHED FILTERS FOR NOISE REDUCTION

BACKGROUND

The present invention generally relates to devices and methods for cross-point arrays, and more particularly to cross-point arrays having reduced signal degradation in the presences of noise using matched filters.

Demands for greater availability of memory have increased with advances in artificial intelligence technologies. Cross-point arrays can be used to implement an in-memory computation. More specifically, the array memory elements are used to implement an analog computation of the multiply-accumulate (MAC) operation which is needed for artificial neural networks (ANN). However, the expansion of these memory arrays is limited by noise. The larger the array, the more noise issues arise as there is a maximum limit on a total amount of current that can be used. A larger array requires greater scaling of current with the number of devices in the array, and the scaling of current is limited by noise level.

SUMMARY

In accordance with an embodiment of the present invention, a cross-point array includes an array of Resistive Processing Unit (RPU) devices having rows and columns interconnected at cross-points, wherein the RPU devices receive a finite duration input voltage on the rows and output a current on the columns. An input-signal matched filter is coupled to each of the columns to reduce noise in the current in accordance with the finite duration input voltage.

In accordance with another embodiment of the present invention, a cross-point array includes an array of RPU devices having rows and columns interconnected at cross-points. A plurality of input-signal matched filters each coupled to a column of the columns and including a custom bandpass filter are configured to find an input voltage signal having a sinusoidal form of finite duration in a noisy output current signal to reduce noise.

In accordance with an embodiment of the present invention, a method for fabricating a cross-point array with reduced noise includes forming an array of Resistive Processing Unit (RPU) devices having rows and columns interconnected at cross-points; and forming matched filters coupled to the columns, the matched filters being configured to reduce noise in current output from the RPU devices in accordance with a signal template provided by an input voltage signal.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
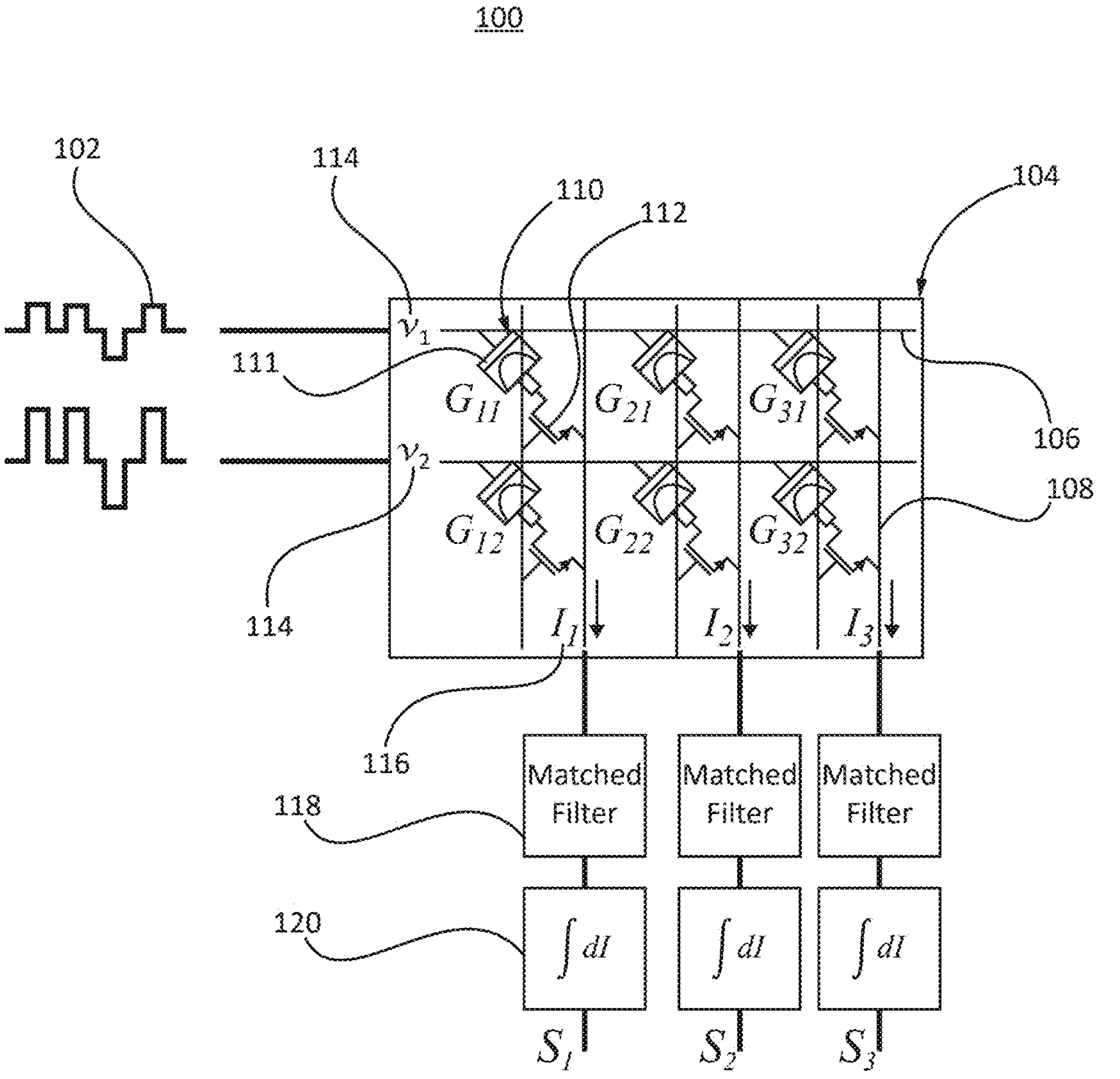
FIG. 1 is a schematic diagram showing a cross-point array having a discretized input pattern, in accordance with an embodiment of the present invention.

Embodiments of the present invention provide cross-point arrays having matched filters to enable computation when noise is present. Cross-point arrays can include a number of technologies. These can include resistive random access memory (ReRAM (or RRAM)), phase change memory (PCM), magnetoresistive random-access memory (MRAM), etc. all of which store information using resistance characteristics. Each of these technologies uses a different technique to reversibly change the resistance of a material (e.g., for an element). To affect a state change, PCM can use current or heat, MRAM can use magnetization, and ReRAM can use material resistivity or heat. The ability to store data as resistance enables these technologies to scale to more advanced geometries than those that store it as an electrical charge. Embodiments of the present invention provide a current path through a resistive element, and the resistive element is not limited to a particular technology. The resistive element can switch between states which provide different determinable resistance levels.

Exemplary applications/uses to which the present invention can be applied include, but are not limited to memory devices, including static or non-transitory memory devices. Analog artificial intelligence (AI) computations can be performed with little degradation to accuracy even when noise is present in computation elements. It is to be understood that aspects of the present invention will be described in terms of a given illustrative architecture; however, other architectures, structures, substrate materials and process features and steps can be varied within the scope of aspects of the present invention.

Programmable resistive elements have an intrinsic stochastic behavior which results in noise that is added to the input signal. Embodiments of the present invention permit computation when noise is present, which is not tied to a specific class of devices or the types of noise generated by these devices.

In accordance with embodiments, a matched filter can identify noise components in the output. Since an input waveform in a system (e.g., a cross point array) is known and assuming that the system is a linear system, then the output will have a same waveform function. An output waveform may be attenuated or amplified with respect to the input, and the output waveform may be shifted in time (e.g., delayed with respect to the input). However, since the system is linear the same waveform is provided at the output. For example, if the input includes a sinewave, sin(ωt), then the output can only be a sinewave, A sin(ωt−D), here A is attenuation or gain, and D is the delay with respect to the input. As the input signal propagates by the system, noise is added to the signal. There are many sources of noise. The matched filter searches for the expected output waveform in the noisy signal and, since the input waveform is known, can distinguish the desired output signals (which will have a same form as the input signal) from noise. The matched filter is designed based on the input waveform. Since the matched filter is designed based on the input waveform, the matched filter can be referred to as an input-signal matched filter.

When the device is nonlinear, the output does not need to have the same functional form as the input. However, when the input signal is small, the device can be linearized around the operation point, and a matched filter can be coupled as described. Given the robustness of the system to noise when matched filters are used, working with small signals does not degrade overall computation accuracy. A small signal is any signal small enough to not reveal nonlinearities, e.g., additional harmonics, in the signal. In an example, small is defined by an input voltage V<<1. Here, the nonlinearity of the circuit (e.g., the resistive elements being nonlinear) can be neglected. If V=A sin(ωt) and A<<1 (small signal) then, the output will only contain a sinewave at frequency ω. However, if A is large, A>1, then in addition to the sinewave at frequency ω, there would be sinewaves at frequencies 2ω, 3ω, etc. (harmonics).

In a cross-point array, a voltage can be input to output a current in accordance with a respective resistive element. However, in large arrays, the output current can become dominated by noise. This noise influences the size and density of the array that can reliably be employed. Embodiments of the present invention provide a cross-point array having matched filters that receive an output from resistive elements in the array to identify the input signal among noise provided in the output signals. The matched filters are customized to filter frequencies in accordance with an expected output based upon an input signal. The matched filters can be analog or digital and can correspond to the input signal. In an embodiment, each matched filter coupled to an output is designed based on the input signal for optimal signal to noise ratio. The input signals are of finite duration and basic elements of the input signal are known (e.g., bandwidth). As such an input signal template can be determined to find the input characteristic in a noisy output signal. In this way, a matched filter can be designed, customized and included as part of the cross-point array to reduce noise and improve signal to noise ratio (SNR).

An output of the matched filter is given by correlating a delayed signal, or template, from the input with an unknown signal (e.g., output current with noise) to detect the presence of the template in the unknown signal. The unknown signal is convolved with a conjugated time-reversed version of the template. The matched filter provides an optimal filter for maximizing the SNR.

In some embodiments, the input signal can include a finite length (T) sinusoidal wave and the matched filter (H(ω)) includes a bandpass filter. The matched filter equation can employ a Fourier transform of the input signal (s(t)) that is a delta function at ω convolved by a sinc function (sinc(x) is sin(x)/x)). The bandpass filter can include, e.g., T sinc (ωT/2π). This provides a bandpass filter for the matched filter that is centered on the frequency range of ω (e.g., resonant or center frequency).

Referring now to the drawings in which like numerals represent the same or similar elements and initially to FIG. 1, a cross-point array device 100 is shown in accordance with an embodiments of the present invention. The cross-point array device 100 includes a cross-point array 104 that includes a plurality of Resistive Processing Unit (RPU) devices $G_{xy}$ (with x and y being position indices) that are connected (cross-coupled) across metal lines 106 and 108 in rows and columns. In an example, RPU device Gu refers to a cell connected at column 1 and row 1 of the cross-point array 104. For illustrative purposes, FIG. 1 shows RPU devices $G_{11}$, $G_{12}$, $G_{21}$, $G_{22}$, $G_{31}$, $G_{32}$. It should be understood that the cross-point array 104 can be much larger having thousands, millions or billions of cells. Each RPU device $G_{xy}$ can include a nonvolatile tunable resistive element 110 (of conductance G) and an access device 112. In some embodiments, the element 110 includes a resistive element and can include one or more of ReRAM, PCM and/or MRAM elements. The access device 112 can include a field effect transistor; however other switching devices can be employed, e.g., ovonic switching without access devices.

The cross-point array 104 can have the RPU devices $G_{xy}$ subjected to an input voltage 114 (e.g., $V_1$, $V_2$) (input signal). The input voltage 114 can include any signal of arbitrary function f(t) (e.g., sin(ωt) or any sequence of discrete pulses (a discretized signal 102) or pattern. An input pattern amplitude is scaled based on the input voltage 114. The input voltage 114 causes the RPU devices $G_{xy}$, when accessed, to output a current 116 (e.g., currents $I_1$, $I_2$, $I_3$). The currents $I_1$, $I_2$, $I_3$ are each output to matched filters 118. The filtered currents $I_1$, $I_2$, $I_3$ are then passed to current integrator circuits 120, which can be optionally provided. The integrator circuit 120 outputs an integral of the respective currents $I_1$, $I_2$, $I_3$ over a time range based on a circuit time constant and a bandwidth of an amplifier used in the integrator circuit. Signals $S_1$, $S_2$, $S_3$ are output and provide a noise reduced pattern. In an exemplary embodiment, where the input voltage 114 are of the form of f(t)=sin(ωt) for a duration of time length T, the matched filter 118 functions as a bandpass filter centered on a frequency range of ω (note: ω=2πf where f is frequency).

Figure 2:
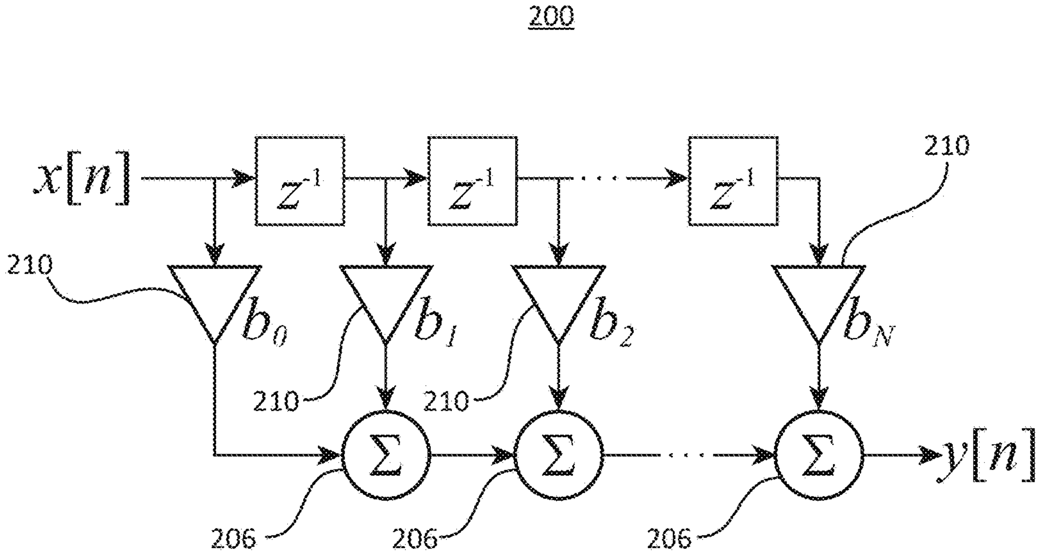
FIG. 2 is a schematic diagram showing an illustrative digital bandpass filter, in accordance with an embodiment of the present invention.

Referring to FIG. 2, a digital finite impulse response (FIR) filter 200 is illustratively shown in accordance with an embodiment. By choice of appropriate coefficients $b_1$, $b_2$, . . . , $b_N$, filter 200 can be used to implement a matched filter 118 (FIG. 1). Other filter designs can also be employed. Referring now to the above exemplary embodiment, the matched filter 118 includes a bandpass filter to output, e.g., a 0 dB magnitude (a unity transmission) in a predetermined frequency range, and a suppression (attenuation) of the input in all other frequencies. In this example, the matched filter 118 can include the digital bandpass filter 200 that can define a passband by specifying a low frequency cutoff (non-zero) and a high frequency cutoff, e.g., a frequency range of $0.35\pi \leq \omega \leq 0.65\pi$. The bandpass filter 200 can include an input x[n] and an output y[n]. A discrete convolution of the bandpass filter can be written as, e.g.:

$$y[n] = b_0 x[n] + b_1 x[n-1] + \cdots + b_N x[n-N] = \sum_{i=0}^{N} b_i \cdot x[n-i],$$

where N is the filter order and $b_i$ is the value of the impulse response at the $i^{th}$ instant and filter coefficient of finite impulse response (FIR) filter. x[n−i] terms are the taps and provide delayed inputs through delay elements 210 to multiplication operations (summers 206). $Z^{-1}$ represents the input to the filter delayed by one sample. The computation of the $b_n$ coefficient can be carried out using a software tool such as Matlab® or the like. In an example, a finite impulse response (FIR) bandpass filter can be designed for the digital bandpass filter 200 for amplitude frequency characteristics. The FIR filter will include a number of taps (order) that can control the amount of memory needed to implement the digital bandpass filter, a number of calculations needed, and an amount of "filtering" the digital bandpass filter can do. The more taps means more stopband attenuation and less ripple.

Figure 3:
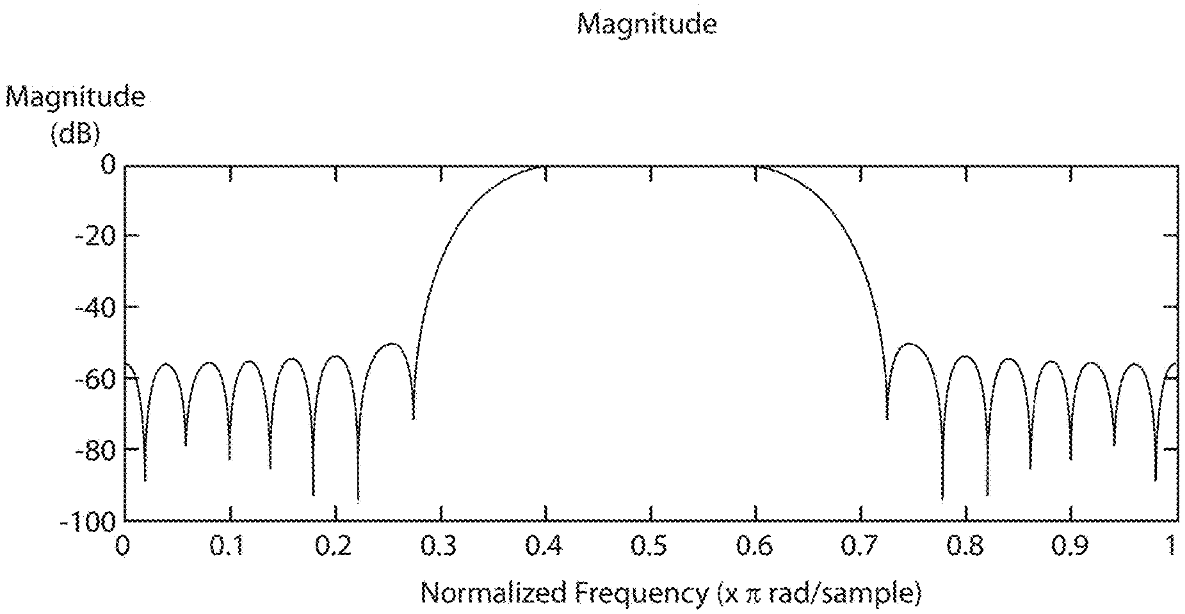
FIG. 3 is a Bode plot showing a frequency response for a $48^{th}$ order finite impulse response filter, in accordance with an embodiment of the present invention.

In an embodiment, a $48^{th}$-order FIR bandpass filter with a passband of $0.35\pi \leq \omega \leq 0.65\pi$ rad/sample can be designed having a response of magnitude (dB) versus normalized frequency (times π rad/sample) as depicted in FIG. 3. This filter can be designed using a software tool such as Matlab® or Octave® by running the code: b=fir1(48, [0.35 0.65]); freqz(b,1,512); (where b is the coefficient $b_n$, 1 is the increment and 512 is the sample size). The $48^{th}$-order FIR bandpass filter shown in FIG. 3 can be employed for the matched filter 118 (FIG. 1) for the output signals. It should be understood that different order filters, different frequency ranges and different filter characteristics can be varied in accordance with embodiments of the present invention. The matched filter 118 is customized to known input signal characteristics.

Figure 4:
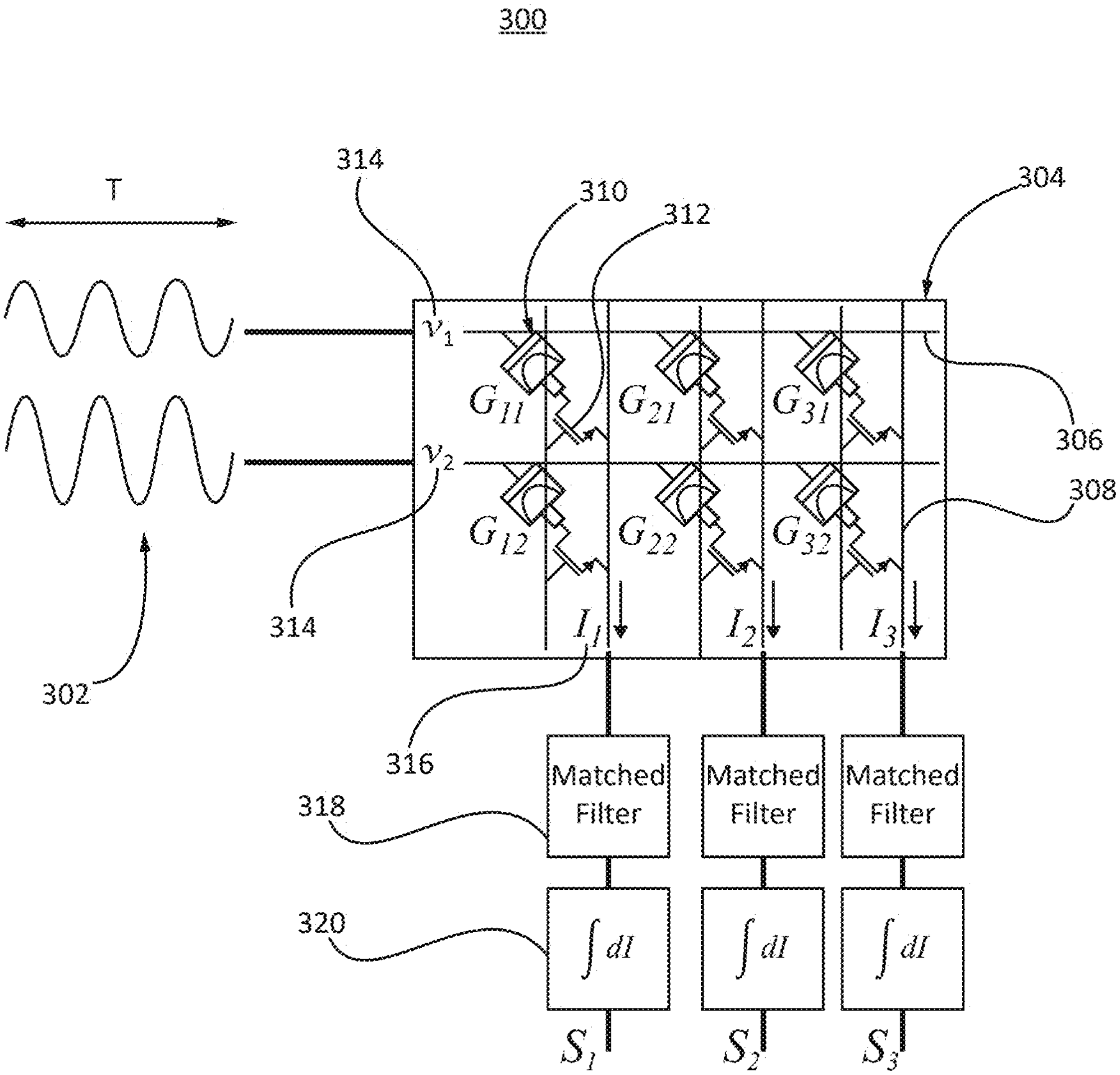
FIG. 4 is a schematic diagram showing a cross-point array having an analog input pattern, in accordance with an embodiment of the present invention.

Referring to FIG. 4, a cross-point array device 300 is shown in accordance with embodiments of the present invention. The cross-point array device 300 includes a cross-point array 304 that includes a plurality of RPU devices $G_{xy}$ that are connected (cross-coupled) across metal lines 306 and 308 in rows and columns. In an example, RPU device $G_{21}$ refers to the RPU device connected at column 2 and row 1 of the cross-point array 304. For illustrative purposes, FIG. 4 shows RPU devices $G_{11}$, $G_{12}$, $G_{21}$, $G_{22}$, $G_{31}$, $G_{32}$. It should be understood that the cross-point array 304 can be much larger having thousands, millions or billions of cells. Each RPU device $G_{xy}$, can include a nonvolatile tunable resistive element 310 and an access device 312. In some embodiments, the element 310 includes a resistive element and can include one or more of ReRAM, PCM and/or MRAM elements. The access device 312 can include a field effect transistor; however other switching devices can be employed, e.g., ovonic switching without access devices.

The cross-point array 304 can have the RPU devices $G_{xy}$ subjected to an input voltage 314 (e.g., $V_1$, $V_2$). The input voltage 314 can include an analog signal 302 of duration T. An input pattern amplitude is scaled based on the input voltage 314. The input voltage 314 causes the RPU device G, when accessed, to output a current 316 (e.g., currents $I_1$, $I_2$, $I_3$). The currents $I_1$, $I_2$, $I_3$ are each output to matched filters 318. The currents $I_1$, $I_2$, $I_3$ are passed to current integrator circuits 320, which can be optionally provided. The integrator circuit 320 outputs an integral of the respective currents $I_1$, $I_2$, $I_3$ over a frequency range based on a circuit time constant and a bandwidth of an amplifier used in the integrator circuit. Signals $S_1$, $S_2$, $S_3$ are output and provide a noise reduced pattern. In an embodiment, the matched filter 318 functions as a bandpass filter centered on a frequency range of ω.

As an example, an analog signal can be selected, which can include a finite sinusoidal wave s(t)=sin(ωt) w(t), where w(t) is a window function:

$$w(t) = \begin{cases} 1 & 0 < t < T \\ 0 & t < 0 \text{ or } t > T \end{cases}.$$

A matched filter H(ω) can be defined as: $H(\omega)=Ae^{(-i\omega t_0)} S^*(\omega)$ where A is a constant equal to maximum filter gain (which can be unity); to is t when the signal is at its maximum; S*(ω) is the complex conjugate of S(ω), where S(ω) is the Fourier transform of the input signal s(t), which is a delta function at ω convolved by a sinc function. Then, in one embodiment: $|H(\omega)|=|S(\omega)|=T\ \mathrm{sinc}(\omega T/2\pi)$. This is exactly a bandpass filter centered at ω.

The output of the matched filter is given by correlating a known delayed signal, or template (e.g., the input signal), with an unknown signal (noisy output) to detect the presence of the template in the unknown signal. This is equivalent to convolving the unknown signal with a conjugated time-reversed version of the template. The matched filter is the optimal filter for maximizing the signal-to-noise ratio (SNR) in the presence of additive stochastic noise.

Figure 5:
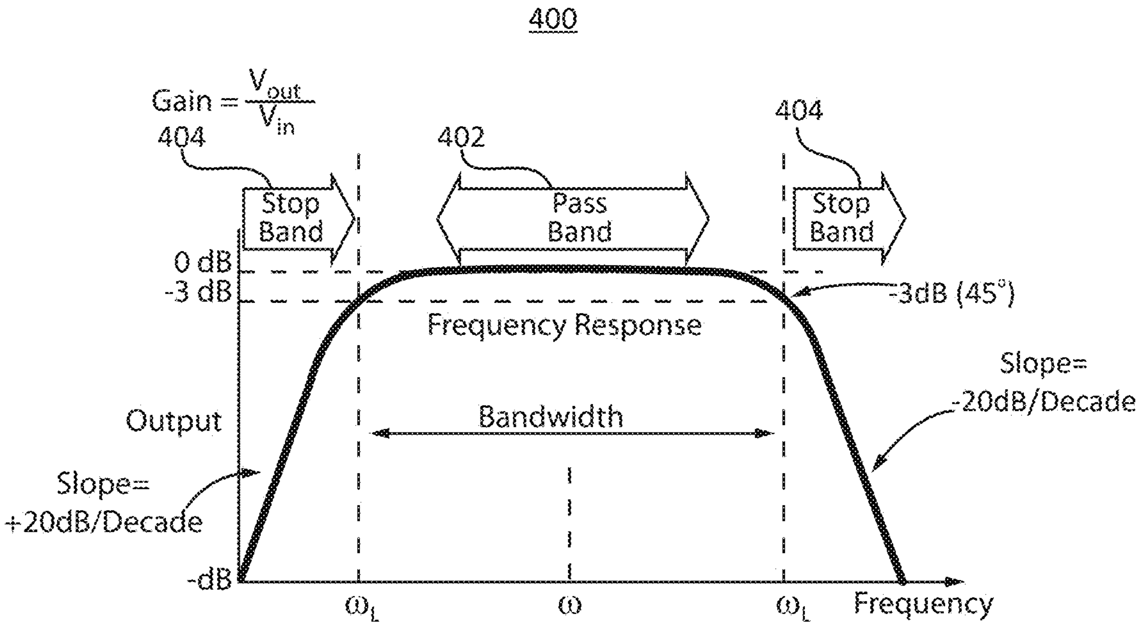
FIG. 5 is a Bode plot showing a frequency response for an analog bandpass filter, in accordance with an embodiment of the present invention.

Referring to FIG. 5, a Bode plot 400 showing a frequency response for an analog bandpass filter employed in the matched filter 318 is shown in accordance with an embodiments of the present invention. A passband 402 is centered on ω between $\omega_L$ and $\omega_H$. The passband 402 has a magnitude of about 0 dB. −3 dB lines define boundaries between stop bands 404 and the passband 402. The matched filter 318 can include a passive filter or an active filter.

Figure 6:
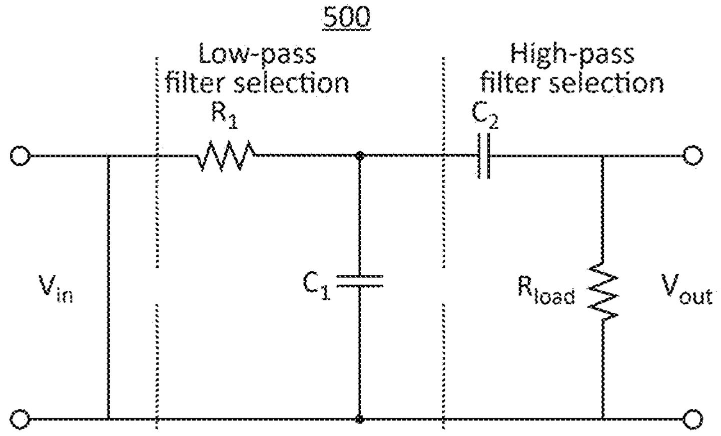
FIG. 6 is a schematic diagram showing an illustrative passive analog bandpass filter, in accordance with an embodiment of the present invention.

Referring to FIG. 6, a passive bandpass filter circuit 500 that can be employed as a matched filter 318 is shown in accordance with an example. The passive bandpass filter circuit 500 includes elements, e.g., $R_1$, $C_1$, $C_2$ and $R_{load}$. $R_1$, $C_1$ are associated with a lowpass filter portion and $C_2$ and $R_{load}$ are associated with a highpass filter portion. Values for these elements can be computed using the relationships:

$$f_L = \frac{1}{2\pi R_1 C_1} \text{ and } f_H = \frac{1}{2\pi R_{load} C_2} \text{ and Gain} = Vout/Vin.$$

The matched filter 318 is customized to known input signal characteristics. Other bandpass filter designs can also be employed.

Figure 7:
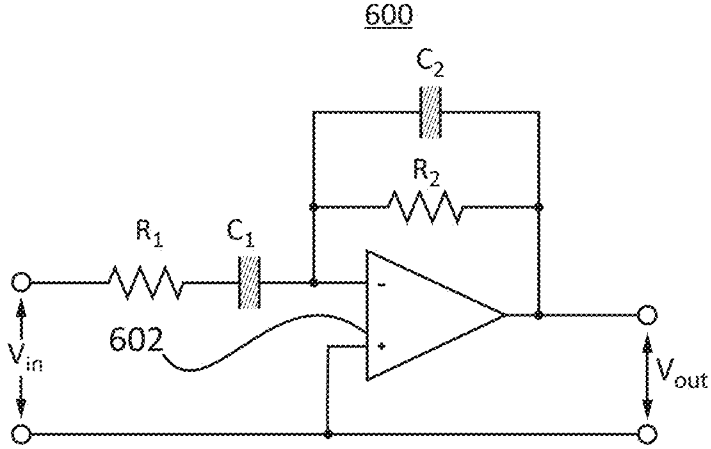
FIG. 7 is a schematic diagram showing an illustrative active analog bandpass filter, in accordance with an embodiment of the present invention.

Referring to FIG. 7, an active bandpass filter circuit 600 that can be employed as a matched filter 318 is shown in accordance with an example. The active bandpass filter circuit includes elements, e.g., $R_1$, $C_1$, $C_2$ and $R_2$ and functions as an inverting band pass filter. The inverting band pass filter is designed to have a narrower pass band. A center frequency and bandwidth of the filter are related to the values of $R_1$, $R_2$, $C_1$ and $C_2$. The output of the filter is taken from the output of an amplifier 602. The amplifier 602 provides separation/isolation between the frequency cutoff points of the bandpass to prevent interactions between the low and high pass stages. The amplifier 602 also provides an overall gain of the circuit 600.

$R_1$, $C_1$ are associated with a lowpass filter portion and $C_2$ and $R_2$ are associated with a highpass filter portion. Values for these elements can be computed using the relationships:

$$f_L = \frac{1}{2\pi R_1 C_1} \text{ and } f_H = \frac{1}{2\pi R_2 C_2}$$

and Gain=Vout/Vin=$-R_2/R_1$.

The matched filter 318 is customized to known input signal characteristics. Other bandpass filter designs can also be employed.

Figure 8:
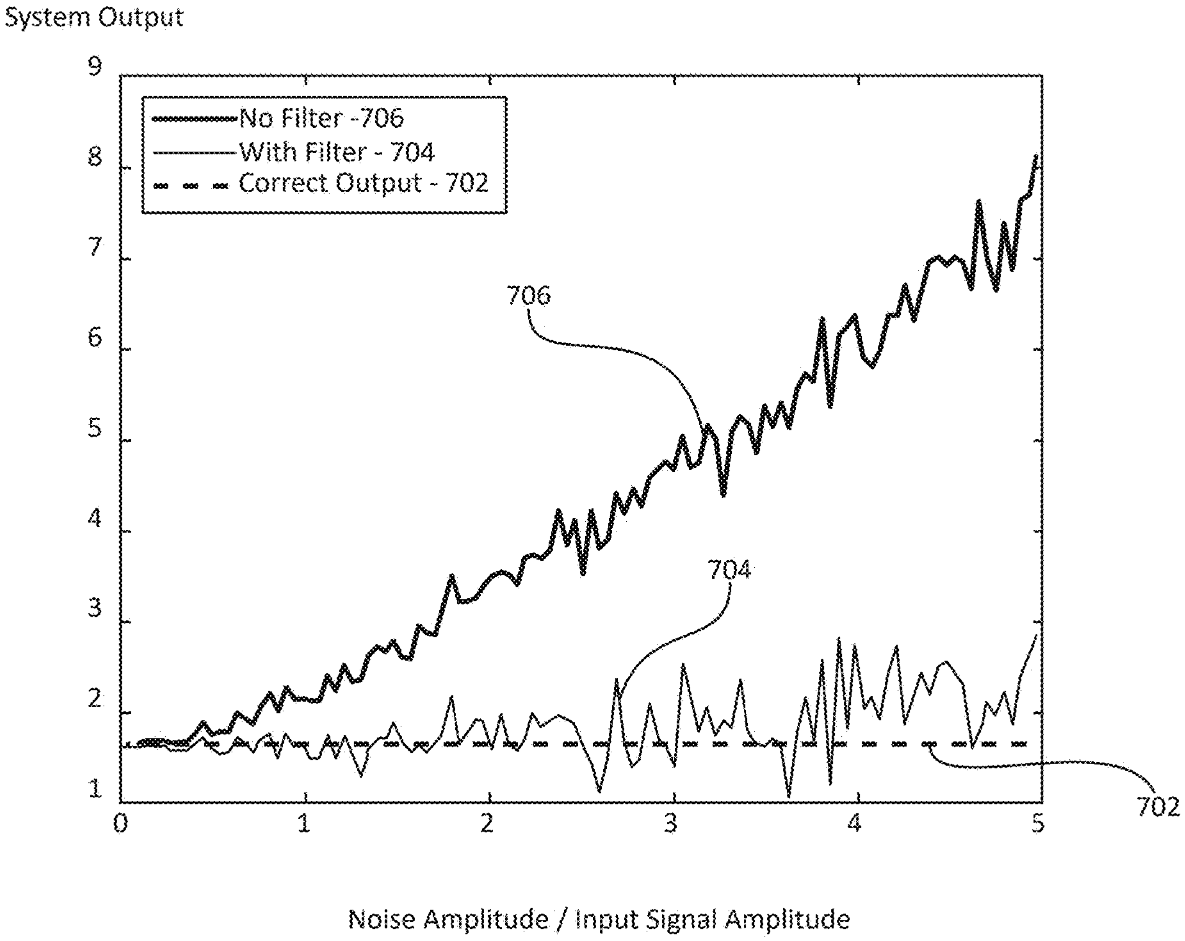
FIG. 8 is a diagram plotting a response with a matched filter, without a matched filter and a correct output, in accordance with an embodiment of the present invention.

Referring to FIG. 8, a plot of system output (y-axis) versus noise amplitude divided by input signal amplitude (x-axis) is illustratively shown. For this plot, system bandwidth=1 GHz, input duration T=128 ns and noise amplitude varied from 0 to 5× (input voltage $V_1$ or $V_2$). Even when the noise amplitude of a filtered plot 704 is 5× an input amplitude, the output is close to a correct value (e.g., zero noise) output as depicted on a correct output plot 702 when filtering is used. However, without the use of a matched filter as shown in no filter plot 706, the system output quickly diverges from the expected output of the correct output plot 702.

It should be understood that other input signals can be provided. These input signals include characteristics that are known in advance. As such, a design of the matched filters is also known in advance. The matched filters can be incorporated in the manufacturing process of the cross-point array. The cross-point array can include linear or nonlinear memory elements (for small input signals). Even if the cross-point array is nonlinear, e.g., resistance is a function of voltage, the input voltage can be small and even be less than the noise amplitude and still produce the correct output. As such, embodiments of the present invention are robust even in a cross-point array with nonlinear characteristics.

In particularly useful embodiments, the input signal is applied for a same duration (T) so there is no need for a duration buffer. If an AC signal with amplitude V is employed, it consumes less power as compared with a DC signal with same amplitude, e.g., $P_{AC}=½*V^2/R$, while $P_{DC}=V^2/R$. The time varying signal needs to last just long enough to permit temporal modes (e.g., frequencies) to be established, e.g., a square wave with a duration proportional to the amplitude can be employed.

The cross-point array in accordance with embodiments of the present invention can be included in Resistive Processing Unit-based (RPU-based) neural networks, in an analog-vector-matrix multiplier applications or other computations, employed in memory storage applications, etc. For example, to train the cross-point array forward, backward propagation and a weight update operation can be employed using an input vector (a voltage pulse $V_1$) in each row. A weight matrix can be represented by respective conductances (G) of the resistive devices. An output vector ($S_1$, $S_2$, $S_3$) can be obtained from the current in each column, e.g., using a respective current integrator. A respective Analog-to-Digital Converter (ADC) can also be employed to convert an analog signal to digital or vice versa. The ADC can be connected to an output of the current integrator in order to output a digital value from an integrated analog input. Using the matched filters in accordance with embodiments of the present invention reduces noise and lowers current and therefore enables larger cross-point arrays to be employed.

Embodiments of the present invention may be or include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 9:
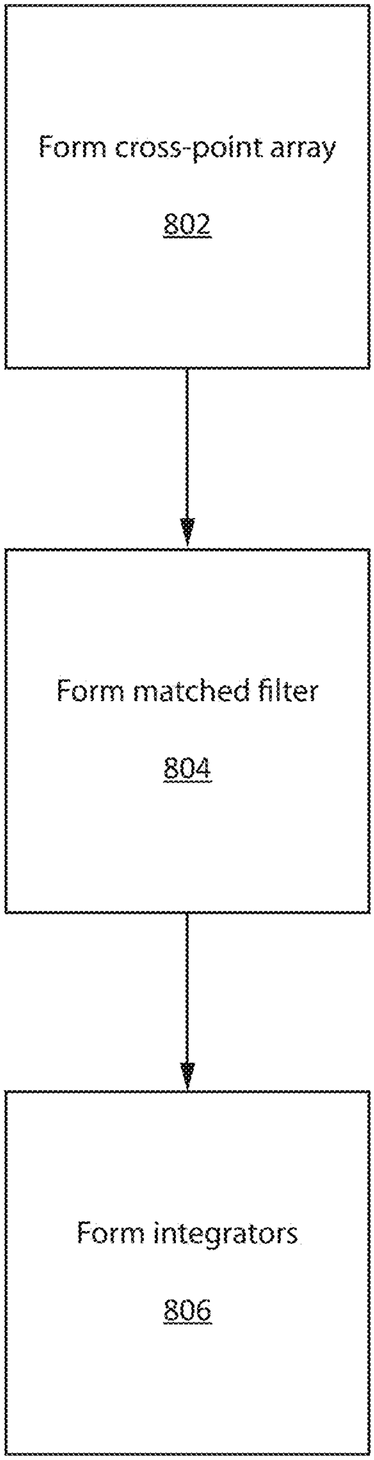
FIG. 9 is a flow diagram showing a method for fabricating a cross-point array with reduced noise, in accordance with an embodiment of the present invention.

Referring to FIG. 9, methods for fabricating a cross-point array with reduced noise are described in accordance with embodiments of the present invention. In block 802, an array of Resistive Processing Unit (RPU) devices having rows and columns interconnected at cross-points are formed. In block 804, matched filters coupled to the columns are formed. The matched filters are configured to reduce noise in current output from the RPU devices in accordance with a signal template provided by an input voltage signal.

The input voltage signal to an RPU device can include a digital signal or an analog signal. The matched filter can include a bandpass filter that is designed for digital or analog operation in accordance with the input voltage signal. The input voltage signal can include a bandwidth (frequency range) and duration, which can be employed in designing components (e.g., resistors, capacitors, op-amps, etc.) for the matched filter. For example, the input voltage signal can include a finite duration sinusoidal signal. In an embodiment, adjustable components (e.g., resistors, capacitors, op-amps, etc.) can be employed to permit some adjustment in the frequency response of the matched filters, e.g., variable resistors or capacitors can be employed.

In block 806, integrators coupled to the matched filters along the columns can be formed. Blocks 802, 804 and 806 can be sequentially or concurrently executed during a semiconductor processing fabrication process.

Reference in the specification to “one embodiment” or “an embodiment” of the present invention, as well as other variations thereof, means that a particular feature, structure, characteristic, and so forth described in connection with the embodiment is included in at least one embodiment of the present invention. Thus, the appearances of the phrase “in one embodiment” or “in an embodiment”, as well any other variations, appearing in various places throughout the specification are not necessarily all referring to the same embodiment.

It is to be appreciated that the use of any of the following “/”, “and/or”, and “at least one of”, for example, in the cases of “A/B”, “A and/or B” and “at least one of A and B”, is intended to encompass the selection of the first listed option (A) only, or the selection of the second listed option (B) only, or the selection of both options (A and B). As a further example, in the cases of “A, B, and/or C” and “at least one of A, B, and C”, such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of systems and methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A cross-point array, comprising:

an array of Resistive Processing Unit (RPU) devices having rows and columns interconnected at cross-points, wherein the RPU devices receive a finite duration input voltage on the rows and output a current on the columns and each RPU device includes a nonvolatile tunable resistive element and an access device; and an input-signal matched filter coupled to each of the columns to reduce noise in the current in accordance with the finite duration input voltage, wherein the matched filter reduces noise in current output from the RPU devices in accordance with a signal template provided by an input voltage signal, wherein the matched filter includes a digital bandpass filter and a finite impulse response filter designed for the digital bandpass filter for amplitude frequency characteristics.

2. The cross-point array of claim 1, wherein the finite duration input voltage includes a discretized signal.

3. The cross-point array of claim 1, wherein the finite duration input voltage includes an analog signal.

4. The cross-point array of claim 1, wherein the input-signal matched filter includes a passive bandpass filter.

5. The cross-point array of claim 1, wherein the input-signal matched filter includes an active bandpass filter.

6. The cross-point array of claim 1, further comprising integrators coupled to the input-signal matched filters along the columns.

7. A cross-point array, comprising:

an array of Resistive Processing Unit (RPU) devices having rows and columns interconnected at cross-point, wherein each RPU device includes a nonvolatile tunable resistive element and an access device; and a plurality of input-signal matched filters each coupled to a column of the columns and including a custom bandpass filter configured to find an input voltage signal having a sinusoidal form of finite duration in a noisy output current signal to reduce noise, wherein each matched filter reduces noise in current output from the RPU devices in accordance with a signal template provided by an input voltage signal, wherein the matched filter includes a digital bandpass filter and a finite impulse response filter designed for the digital bandpass filter for amplitude frequency characteristics.

8. The cross-point array of claim 7, wherein the plurality of input-signal matched filters include a discretized filter.

9. The cross-point array of claim 7, wherein the plurality of input-signal matched filters include an analog filter.

10. The cross-point array of claim 7, wherein the plurality of input-signal matched filters include a passive bandpass filter.

11. The cross-point array of claim 7, wherein the plurality of input-signal matched filters include an active bandpass filter.

12. The cross-point array of claim 7, further comprising an integrator coupled to each input-signal matched filter along the column.

13. A method for fabricating a cross-point array with reduced noise, comprising:

forming an array of Resistive Processing Unit (RPU) devices having rows and columns interconnected at cross-points, wherein each RPU device includes a nonvolatile tunable resistive element and an access device; and forming matched filters coupled to the columns, the matched filters reduce noise in current output from the RPU devices in accordance with a signal template provided by an input voltage signal, wherein the matched filter includes a digital bandpass filter and a finite impulse response filter designed for the digital bandpass filter for amplitude frequency characteristics.

14. The method of claim 13, wherein the input voltage signal includes a digital signal.

15. The method of claim 13, wherein the input voltage signal includes an analog signal.

16. The method of claim 13, wherein the matched filters include bandpass filters.

17. The method of claim 13, wherein the input voltage signal includes a finite duration sinusoidal signal.

18. The method of claim 13, further comprising forming integrators coupled to the matched filters along the columns.

* * * * *